July 13, 1965  J. M. KRAFFT ETAL  3,194,062
TENSION-COMPRESSION TESTING MACHINE
Filed Oct. 25, 1962  2 Sheets-Sheet 1
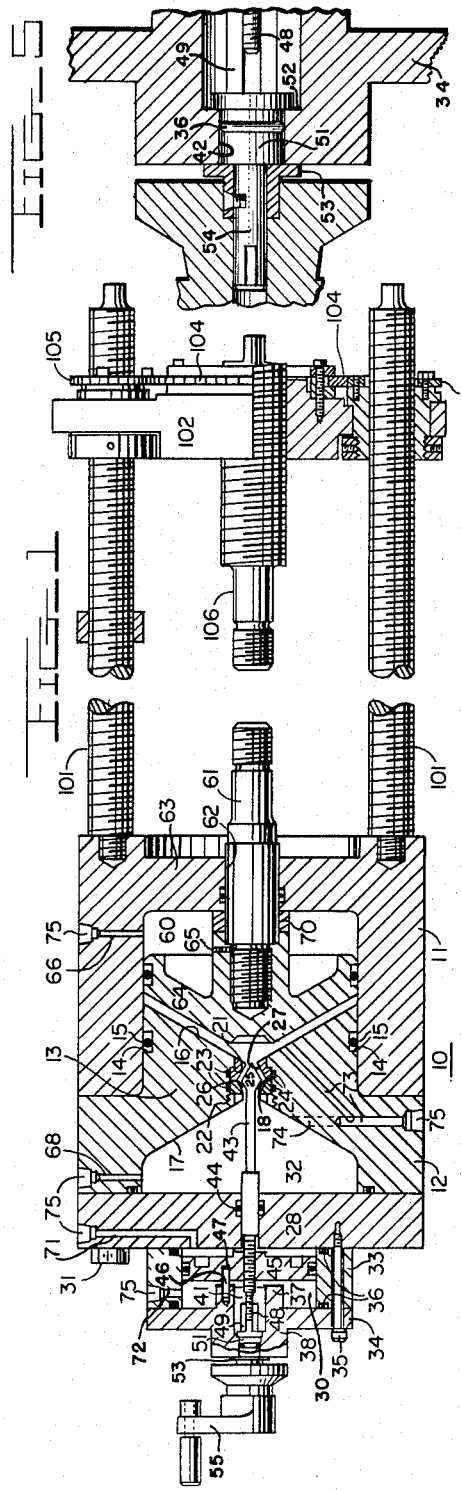
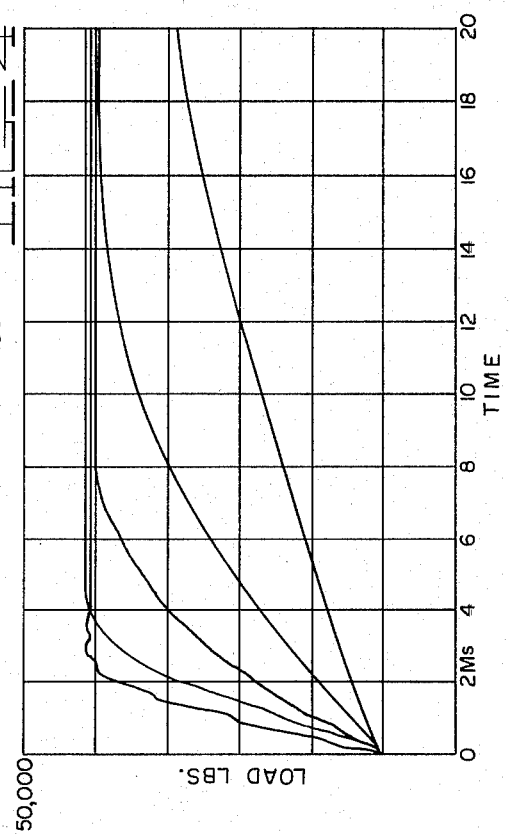
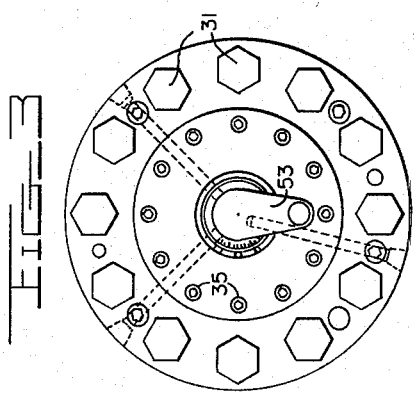
INVENTORS
JOSEPH M. KRAFFT
JOHN C. HAHN
BY
ATTORNEY

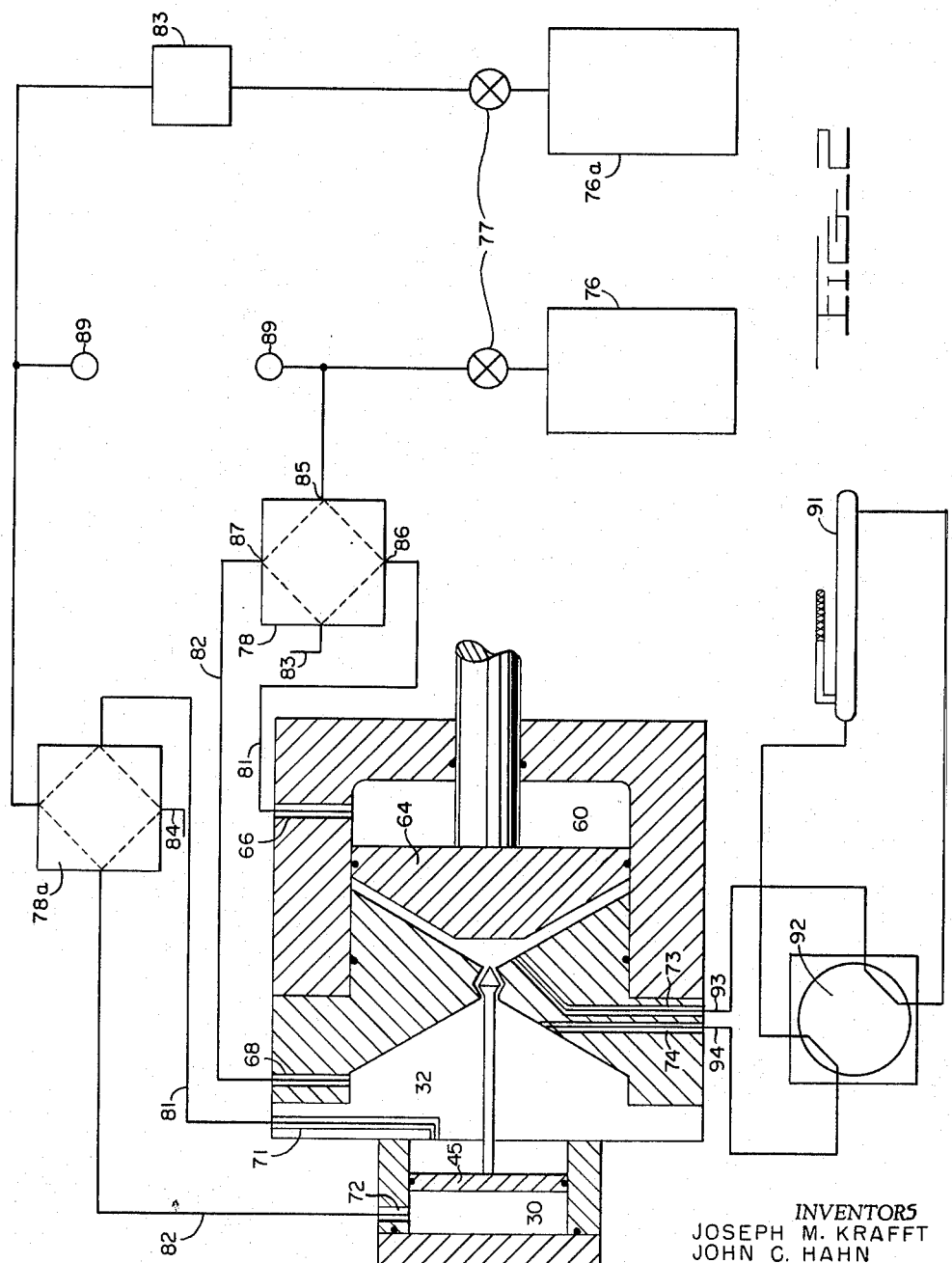

United States Patent Office 3,194,062
Patented July 13, 1965

3,194,062
TENSION-COMPRESSION TESTING MACHINE
Joseph M. Krafft, Alexandria, Va., and John C. Hahn, Washington, D.C., assignors to the United States of America as represented by the Secretary of the Navy
Filed Oct. 25, 1962, Ser. No. 233,166
4 Claims. (Cl. 73—93)
(Granted under Title 35, U.S. Code (1952), sec. 266)

The invention described herein may be manufactured and used by or for the Government of the United States of America for governmental purposes without the payment of any royalties thereon or therefor.

The present invention is directed to materials testing machines and more particularly to a machine for applying either tensile or compressive loads through a single head movable at high speeds. In many materials, important strain rate effects can be observed by increasing head speed above that possible in conventional testing machines. These can be investigated with machines capable of high head speed coupled with instrumentation for measuring load and displacement at such speeds. Most testing machines capable of high loading rates and/or of high head speed can be classified in one of two groups: those loading (1) by rapid expansion of a pressurized gas, or (2) by impact of a massive hammer. Generally, gas loaders are preferred to cover the speed range approaching that possible with standard machines as an impact hammer with sufficient momentum at low speeds would be too massive. However, the simplest gas loaders, because of the gas compressibility, are inherently soft; their stiffness can be increased by requiring the pressurized gas to displace a hydraulic fluid through a restrictive passage in addition to requiring it to load and deform the specimen. The present invention is a hydraulically stiffened type gas actuated rapid loader.

It is therefore an object of the present invention to provide a testing machine capable of high speed, and a uniform rate of loading for tensile or compressive testing of notched or unnotched specimens.

Another object is to provide a single, quick opening valve which serves dual functions of initiating head motion and of throttling the stiffening liquid in order to restrict head speed.

Another object is to provide a testing machine which may be adjustable for different speeds.

Still another object is to provide a testing machine which can be operable from a remote location.

Yet another object is to provide a test machine which is easily adaptable for either tensile or compression testing of materials within the same head space.

Other objects and advantages of the present invention will become apparent to those skilled in the art as the disclosure is made in the following description of the invention illustrated in the accompanying drawings, in which:

FIG. 1 illustrates a cross sectional view in elevation;
FIG. 2 illustrates a schematic drawing of the testing machine, related pressure lines, and control valves;
FIG. 3 is a top view which illustrates a valve control handle for setting the rate of loading control and a scale that represents the amount of rotation of the control which indicates the valve opening; and
FIG. 4 illustrates different scope traces representing loads vs. time for different settings of the throttle valve control.
FIG. 5 illustrates an enlarged view of the drive holding means for adjusting the opening of the valve.

The head of the present testing machine is drawn by a piston which is pressurized on one side by an expandable gas and on the other side by a rather incompressible liquid. Head displacement is controlled by a metering valve which opens to permit the flow of hydraulic fluid, and thus the onset of head movement. The metering valve may be preset to open to any certain degree so that the resulting degree of throttling effects control of the speed of travel of the piston. The testing machine is provided with additional valves and controls which are operated to control the direction of movement of the piston and the amount of pressure available to drive it.

Now referring to the drawings there is shown by illustration a tensile-compression testing device. The device comprises a housing 10 made of two sections 11 and 12 with section 12 having an end portion 13 that telescopes into section 11 with the upper portion extending out over section 11 with their outer wall surfaces in alignment. The end portion 13 has a cutout 14 along the circumference of the outer surface thereof within which a suitable gasket or O-ring 15 is placed to prevent fluid leakage between the inner wall surface of section 11 and the outer wall surface of end portion 13 of section 12. The end portion 13 that telescopes into section 11 has a concave lower surface 16 and the upper surface of section 12 is also concaved to form surface 17. An aperture is centrally located in section 12 between the lower and upper concaved surfaces 16 and 17 to form wall surface 18. The diameter of the aperture adjacent to surface 16 is less than the diameter of the remainder of the aperture to form a shoulder 21 near the end surface 16. The wall surface formed by the aperture is provided with threads 22 which extend for a short distance starting at the upper end surface 17. Between the threaded portion 22 and the shoulder 21, the wall surface 18 is provided with circumferential rectangular cutouts 23 within which suitable seals 24 are placed. Within the aperture between the end surfaces 16 and 17 is placed a throttling valve 25 made in the shape of a double cone for regulating a flow of fluid in either direction through a matching passage formed respectively by upper and lower valve seats 26 and 27 which contain the throttling valve 25. The lower valve seat 27 is formed with an upper portion that approximates the diameter of the aperture and a lower portion that closely fits against the aperture wall of least diameter. Thus the upper portion of valve seat 27 rests against shoulder 21. The valve seat surface converges downwardly toward the center and is parallel with the lower portion of the double cone shaped throttling valve 25. The lower portion of the valve seat 27 is rounded away from the center and aligns with the concave end surface 16 of the end portion 13 of housing section 12. The upper valve seat is similar to the lower valve seat with the valve seat wall surface converging upwardly toward the center, and parallel to the upper portion of throttling valve 25 a cylindrical threaded nut screws down against the upper valve seat section in order to secure the valve seats in place. The nut has a rounded throat section which smoothly meets with the valve seat surface and the upper end at concave surface 17. Gaskets 24 in rectangular cutouts 23 provide a seal between the valve seat sections and the wall of the aperture to prevent any fluid leakage therebetween.

The upper housing section 12 is provided with a flat plate or cover 28 of sufficient thickness to withstand desired high pressures and which is secured in place by bolts 31 that pass through section 12 and are screw threaded into section 11.

A piston-containing pressure chamber 30 is centered on top of cover 28 and formed by a cylindrical member 33 and a cover 34 secured thereto by suitable bolts 35 which pass through the cylindrical member 33 and screw into the cover 28. Suitable gaskets 36 are placed between the cylindrical member 33 and the cover 28 and between the cover 34 and the cylindrical member 33 to prevent any fluid leakage. The cover 34 is much thicker at the center about the axis than at the edge which is secured to the cylindrical member and has a portion 37 that extends downwardly into the chamber and a portion 38 which extends upwardly. A cylindrical cavity 41 is formed in the downwardly extending portion and extends upwardly a distance which is just beyond the level of the top of the thin portion of the cover. The cavity 41 meets with an aperture 42 through the upwardly extending portion wherein the cavity is of greater diameter than the aperture 42.

The throttling valve 25 is provided with an elongated valve stem 43 which extends upwardly through the chamber 32 through the cover 28 and up into the cavity 41 within the cover 34. A suitable gasket 44 is provided between the valve stem and the walls of the cover 28 through which the valve stem extends. The fluid chamber 30 has therein a piston 45 which is screw threaded onto the valve stem and held against rotation within the fluid chamber by a pin 46 secured in the downwardly extending portion 37 of the cover plate and which extends into a cavity 47 in the upper surface of the piston. The upper end 48 of the valve stem is machined to provide opposing flat surfaces such that the flat end portion slidably fits between a bifurcated end 49 of a coupling 51 which passes through the upwardly extending portion 38 of the top cover plate 34. The coupling is prevented from passing upwardly through the aperture 42 by a shoulder 52 within the cavity 41 and is held in place by a collar 53 which is pinned onto a cylindrical portion 54 of the coupling. A handle 55 is secured over the coupling by any suitable means such as by pressure, as shown. The handle is adapted to rotate the coupling which rotates the valve stem to adjust the clearance between the valve 25 and either of the valve seats, 26, 27. Suitable markings are applied near the rotating handle to indicate the adjustment of the valve for a desired throttling opening.

A pressure chamber 60 is formed in the lower section of the housing 10 between the lower surface 16 of the upper section and the inner surfaces of the lower section. A cylindrical weigh-bar 61 passes through an aperture 62 centrally located in the lower wall 63 of the lower section 12 of the housing and connects with a piston 64 in the pressure chamber in the lower section of the housing. The piston 64 is formed at an angle with the axis through the center of the housing in which the angle corresponds to the angle of the concave surface 16 of the lower surface of the upper section of the housing. The weigh-bar 61 is screw threaded into the piston stem and locked in place by a locking screw 65. A suitable gasket is placed around each the piston and the weigh-bar to prevent passage of fluid between their surfaces and the surface of their adjacent surfaces.

The housing is provided with a fluid passage 66 to admit a fluid into or vent a fluid from chamber 60 between the piston and the bottom wall of the lower section of the housing. A passage 68 in the upper section of the housing admits a fluid into or vents a fluid from the chamber 32 between the cover 28 and surface 17 of the upper concave surface of the upper section of the housing. A passage 71 is made into the cover 28 to admit a fluid into or vent a fluid from below the piston 45 within chamber 30. A passage 72 is made through the cylindrical member 33 into chamber 30 to admit into or vent a fluid from the area above piston 45 within chamber 30. A passage 73 is also made through the upper section of the housing to the area above piston 64 to admit a fluid under pressure into the area above piston 64 or to release the pressure above piston 64 through a passage 74 to the chamber 32 between cover 28 and the surface 17 of the upper section of the housing. Each of the passages through the housing is provided with a threaded portion 75 at their inlet into the housing to provide a means by which suitable fluid can be forced into and vented from the respective areas above and below the pistons.

FIG. 2 is directed to a schematic of the pistons and the pressure lines that feed fluid into and vent the fluid from the respective chamber areas above and below the pistons.

The pistons and associated structure are for illustrative purposes only and are shown for the purpose of explaining the operation of the test machine. A fluid under pressure, such as nitrogen, from a tank 76 is connected through a control valve 77 to a four-way valve 78 which is connected with the fluid passages 66 and 68 by suitable pressure lines 81 and 82 to admit fluid under pressure to either pressure chamber 32 or 60 depending on the operation desired. A second source of fluid under pressure from a separate tank 76a is directed through a control valve 77 and a regulator valve 83 to a separate four-way control valve 78a. Fluid under pressure is directed from the four-way control valve 78a to fluid passages 71 and 72 through suitable pressure lines 81 and 82. The four-way control valves operate to permit passage through either of the valves to either of the connected lines 81 or 82 and to vent the line 81 or 82 not under pressure through vent 83 or 84. In operation of the four-way valve, pressure is applied at the inlet 85 and it takes a path to outlet 86 making line 81 the pressure line; when the valve is in this position line 82 is vented through valve port 87 to the vent 83 with the passage between ports 87 and 85 closed. When pressure is applied through line 82 a path is open between ports 85 and 87 and between 86 and the vent 83 with the path closed between 85 and 86. Thus the four-way valve allows fluid under pressure to pass through one side of the valve to a pressure line while simultaneously opening a path through the valve to the vent. Each of the fluid lines to the four-way valves 78, 78a are adapted with a pressure gage 89 so that the pressure in each of the pressure lines can be determined for uniform operation.

The test machine is also provided with a hand or mechanical pump for pumping fluid from chamber 32 into chamber 60 above the piston 64 or from the chamber 60 above the piston 64 to the chamber 32. A mechanical pump 91 is connected with a three way control valve 92 which in operation directs fluid to either chamber 32 or chamber 60 through suitable pressure lines 93 and 94 connected with passages 73 and 74 depending on the position of the valve 92. Valve 92 has an "off" position so that no fluid will pass through either path through the valve.

The bottom section of the housing has extending therefrom spaced, aligned, elongated, threaded columns 101. A fixed crosshead 102 is secured to the bolts and adjusted upwardly toward or downwardly away from the housing to provide a member to which the specimen holders are secured. The fixed crosshead is adjusted by a motor or any other suitable means. In use of a motor, the motor is carried by the crosshead and drives drive gear wheels 104 and driven gear wheels 105 which are threaded onto the column 101. Specimen holder 106 is secured to the crosshead and extends upwardly toward the housing and provides a means to which a specimen is secured by specimen grips, not shown for simplification of the drawings. For securing a specimen between the weigh-bar 61 and specimen holder 106 the fixed plate can be moved along columns 101 to provide a spacing between the specimen holders to receive specimens of different length.

The test machine is operative for either tensile or compression testing. In operation, the chamber 32 is supplied with hydraulic fluid and operates as a reservoir for hydraulic fluid used in the operation of the test machine. As such, the concave surface 17 insures that the hydraulic fluid will always flow downwardly toward throttling valve 25. In operation for tensile testing, the throttling valve 25 is set for the desired flow of fluid through the valve passage. Fluid pressure from fluid pressure container 76a is admitted to chamber 30 above piston 45 through valve 78a, line 82, and passage 72. Pressure above piston 45 forces the piston downwardly displacing any fluid out through passage 71, line 81, valve 78a, and vent 84. This forces throttling valve 25 open. With throttling valve 25 open, fluid pressure from pressure container 76 is applied to chamber 32 above the hydraulic fluid therein through valve 78, line 82, and passage 68. Fluid pressure applied above the hydraulic fluid in chamber 32 forces the hydraulic fluid through the throttling valve passage to the area above piston 64 and forces piston 64 downwardly against stop 70 simultaneously forcing any fluid below piston 64 out through passage 66, line 81, valve port 86, and out through vent 83. With the piston 64 bottomed, the test material 95 is now secured between weigh-bar 61 at one end and material holding element 106 at the opposite end. Valve 25 is now closed by pressurizing chamber 30 below piston 45 by a fluid under pressure from pressure chamber 76a through regulator valve 83, valve 78a, line 81 and housing passage 71 into the chamber. The area above piston 45 is vented through passage 72, line 82, valve 78a, and vent 84. Valve 78 is now rotated to admit a fluid pressure into chamber 60 below valve 64. Fluid pressure is admitted from pressure container 76, through valve 78, line 81, and housing passage simultaneously. Pressure is removed from chamber 32 through housing passage 68, line 82, valve port 87, valve 78, and vent 83. The test machine is now charged and ready for test. In load testing, the throttling valve is opened by setting valve 78a to apply pressure into chamber 30 above piston 45 while venting the chamber below piston 45 back through the valve. Pressure above piston 45 forces the piston downwardly, opening throttling valve 25. When throttling valve 25 is opened, the hydraulic fluid under pressure above piston 64 is released and the fluid flows past valve 25 into chamber 32 in which the pressure was previously released. Piston 64 rises as permitted by the discharge of hydraulic fluid into chamber 32 around throttling valve 25, thereby applying a tension on the test material. As long as a fluid pressure from fluid pressure container 76 is applied into chamber 60 below piston 64, a tension will be applied to the test material. A pressure of 2000 p.s.i. below piston 64 provides a maximum head speed of about 2 ft./sec. in the machine illustrated by the drawing and described in the specification.

FIG. 4 illustrates stress-strain load vs. time curves for different clearance adjustments of the throttling valve. The record shown is for different clearance adjustments as determined by different amounts of rotation of the valve stem which sets the amount of the clearance between the throttling valve and the passage when in its full open position as determined by the setting of the handle 55.

In operation for compression on the test material, throttling valve 25 is adjusted to the desired clearance between the valve and the lower valve seat 27. Valve 64 is then forced up to its maximum by pressure in chamber 60 applied under the valve. Pressure is applied above piston 45 to close throttling valve 25 by forcing piston 45 downwardly. High pressure is then applied to chamber 32 above the hydraulic fluid in chamber 32 simultaneously venting chamber 60 below piston 64. The machine is now ready to apply a compression load on a test material held in place between the holders. Valve 78a is rotated to apply a pressure in chamber 30 below piston 45 while venting the area above piston 45. This forces piston 45 upwardly, opening throttling valve 25. Opening throttling valve 25 permits the flow of hydraulic fluid under pressure through the passage around the throttling valve into the chamber above piston 64. The pressure applied to piston 64 applies a compression force on a test specimen. As long as pressure is applied from pressure chamber 76 to the chamber 32, a compression force will be applied to the test material.

Since the valves in the test machine are operated by fluid pressure controlled by separate valves, the valves, pressure chambers, etc., can be remote from the test machine. This permits one, if desired, to place the test machine in a hot cell where tension or compression can be applied to materials that have been radiated by harmful radiation. Thus the test machine of this invention permits material testing of materials that have been irradiated to determine the effects of any radiation on the materials. By use of hand manipulators which are well known in the radiation field, the test material can be secured into the machine for operation. The spacing of the passage opening about throttling valve 25 can be set by rotation of handle 55 by the hand manipulators or by a motor attached thereto and which could be operated from outside the hot cell. Thus the test machine of this invention can be used to carry out a field of research on materials which cannot be handled by hand because of harmful effects of radiation.

For slow speed operation of the test machine, the throttling valve 25 can be left open and the pressure can be controllably applied to either chamber 32 while venting chamber 60 or pressure may be applied to chamber 60 below piston 64 while venting chamber 32. Another possibility is to pressurize both chamber 32 and the chamber 60 below piston 64 and then controllably depressurize either of the chambers depending on whether tensile or compressive testing is desired. The test machine is also provided with a hand operated hydraulic pump 91 which can be used for fine adjustment of the load piston 64 and for applying tension or compression testing. The hand pump can pump hydraulic fluid from the reservoir in chamber 32 into the area above piston 64 or from the area above piston 64 into the hydraulic reservoir in chamber 32. For tension testing by use of the hand pump, throttling valve 25 is closed, hydraulic fluid is pumped into the area above piston 64, the test specimen is then secured to the specimen holders. Gas pressure is applied below piston 64 and then the hydraulic fluid is pumped from above piston 64 into the reservoir 32 wherein the pressure below piston 64 applies tension on the test specimen. For compression testing, a gas pressure is applied below piston 64 forcing it into the up position. The specimen is connected into the specimen holders and hydraulic fluid is forced into the area above piston 64 applying a compression onto the test specimen.

Obviously many modifications and variations of the present invention are possible in the light of the above teachings. It is therefore to be understood that within the scope of the appended claims the invention may be practiced otherwise than as specifically described.

What is claimed is:

1. A tensile-compression testing machine which comprises a housing, a hydraulic fluid reservoir in said housing, a piston chamber below said reservoir, a centrally located passage between said reservoir and said piston chamber, a valve seat and a valve secured in said passage, fluid operated control means connected with said valve to control passage of hydraulic fluid through the passage between said valve and valve seat, a piston in said piston chamber, said piston chamber having a centrally located aperture through the bottom thereof, a weigh-bar piston rod slidably passing through the aperture in the bottom of said housing and secured to said piston within said piston chamber, means for admitting a gas into said reservoir above said hydraulic fluid and into said piston chamber below said piston and means for securing test specimen holding means below said housing.

2. A tensile-compression testing machine which comprises a housing, a hydraulic fluid reservoir in said housing, a piston chamber below said reservoir and separated therefrom, a centrally located passage between said reservoir and said piston chamber, a valve seat and matching valve secured in said passage, fluid operated control means connected with said valve to control passage of hydraulic fluid through the passage between said valve and valve seat, a piston in said piston chamber adapted for movement along the linear axis of said housing, seal means about said piston to prevent fluid leakage between said piston and the piston chamber wall, said piston chamber having an axially aligned aperture through the bottom thereof in said housing, a weigh-bar, piston rod slidably positioned through said piston chamber aperture and connected with said piston within said piston chamber, means for admitting a gaseous fluid into said reservoir above said hydraulic fluid and into said piston chamber below said piston and for venting said gaseous fluid from said reservoir and from said piston chamber below said piston, and means positioned relative to said housing and weigh-bar for securing test specimen holding means.

3. A control means for controlling the rate of movement and direction of movement of an energy applying piston in a tensile-compression testing machine which comprises a housing, a liquid fluid reservoir in said housing, a first fluid pressure chamber, an energy applying piston in said first fluid pressure chamber, a partition separating said reservoir and said piston chamber, an axially aligned cylindrical passage within said partition between said reservoir and said piston chamber, a pair of linearly aligned valve seats secured in said cylindrical passage, an activating and throttling valve positioned between said valve seats for closing the passage by seating against either of said valve seats, a second fluid pressure chamber, said second fluid pressure chamber positioned above said reservoir and separated therefrom, a valve control piston in said second fluid pressure chamber, a piston rod threaded on one end and secured at said threaded end to said valve control piston with said screw threaded end extending into said second fluid pressure chamber above said valve control piston, a valve stem connected at one end to said valve with the other end secured against rotation to said piston rod for axial movement therewith, means for admitting a fluid into said second fluid pressure chamber on either side of said valve control piston, means for venting fluid from either side of said valve control piston, said valve control piston adapted to close said valve and to open said valve depending on the pressure applied to said valve control piston, said valve controlling passage of fluid between said valve seats and said valve to control said energy applying piston, means to supply a gaseous fluid under pressure into said reservoir and to vent gaseous fluid from said reservoir and means to supply a gaseous fluid under pressure to said first pressure chamber below said energy applying piston therein and to vent gaseous fluid from said first pressure chamber from below said energy applying piston.

4. A tensile-compressive testing machine which comprises a cylindrical pressure vessel having cylindrical inner walls, a primary piston adapted to slide along the inner wall of said pressure vessel, a connecting rod extending through said vessel and attached to said primary piston, a reservoir in said pressure vessel above said primary piston, means for admitting a hydraulic fluid to the side of said piston opposite from said connecting rod, means for applying a gas under pressure to the side of said piston connected to said connecting rod, said vessel provided with a valve port between said reservoir and the primary piston, a valve seat in said port, a valve in said port for controllably releasing hydraulic fluid from above said piston to said reservoir, and from said reservoir to said pressure vessel into the area above said primary piston, a secondary cylinder secured to said pressure vessel above said reservoir, a secondary piston in said secondary cylinder, means for admitting a gas into and releasing a gas from said secondary vessel above and below said secondary piston, means for connecting said secondary piston to said valve, adjustable means for adjustably limiting the stroke of said secondary piston whereby operation of said secondary piston operates said valve to limit a flow of hydraulic fluid through said valve port to restrict the rate of movement of said primary piston due to gas pressure thereon, and means for connecting a test specimen between said connecting rod and a specimen holder connected with said pressure vessel.

References Cited by the Examiner
UNITED STATES PATENTS

| | | | |
|---|---|---|---|
| 2,371,450 | 3/45 | Langdon | 91—4 X |
| 2,834,569 | 5/58 | Nickerson | 251—62 |
| 2,854,919 | 10/58 | Vltavsky | 100—269 |

RICHARD C. QUEISSER, *Primary Examiner.*

JOSEPH P. STRIZAK, *Examiner.*